(12) United States Patent
    Isachar et al.

(10) Patent No.: US 9,043,590 B2
(45) Date of Patent: May 26, 2015

(54) REDUCING PEAK CURRENT IN MEMORY SYSTEMS

(71) Applicant: Apple Inc., Cupertino, CA (US)

(72) Inventors: Ori Isachar, Tel Aviv (IL); Julian Vlaiko, Kfar Saba (IL); Gil Semo, Tel Aviv (IL); Atai Levy, Ra'anana (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/055,144

(22) Filed: Oct. 16, 2013

(65) Prior Publication Data

US 2014/0047200 A1  Feb. 13, 2014

Related U.S. Application Data

(62) Division of application No. 13/021,754, filed on Feb. 6, 2011, now Pat. No. 8,572,423.

(60) Provisional application No. 61/357,114, filed on Jun. 22, 2010.

(51) Int. Cl.
    *G06F 3/06* (2006.01)
    *G06F 1/32* (2006.01)

(52) U.S. Cl.
    CPC ............ *G06F 3/0659* (2013.01); *G06F 1/3225* (2013.01); *G06F 3/0604* (2013.01); *G06F 3/0683* (2013.01)

(58) Field of Classification Search
    USPC .......................................... 713/154
    See application file for complete search history.

(56) References Cited

U.S. PATENT DOCUMENTS

2008/0049505 A1 * 2/2008 Kim et al. ............... 365/185.11
2009/0198857 A1 * 8/2009 Pyeon ........................ 710/307

* cited by examiner

*Primary Examiner* — Hoai V Ho
(74) *Attorney, Agent, or Firm* — Meyertons, Hood, Kivlin, Kowert & Goetzel, P.C.

(57) ABSTRACT

A memory device includes a plurality of memory cells, a token input interface, a token output interface and control circuitry. The control circuitry is configured to accept a storage command, to condition execution of at least a part of the storage command on a presence of a token pulse on the token input interface, to execute the storage command, including the conditioned part, in the memory cells upon reception of the token pulse on the token input interface, and to reproduce the token pulse on the token output interface upon completion of the execution.

14 Claims, 3 Drawing Sheets

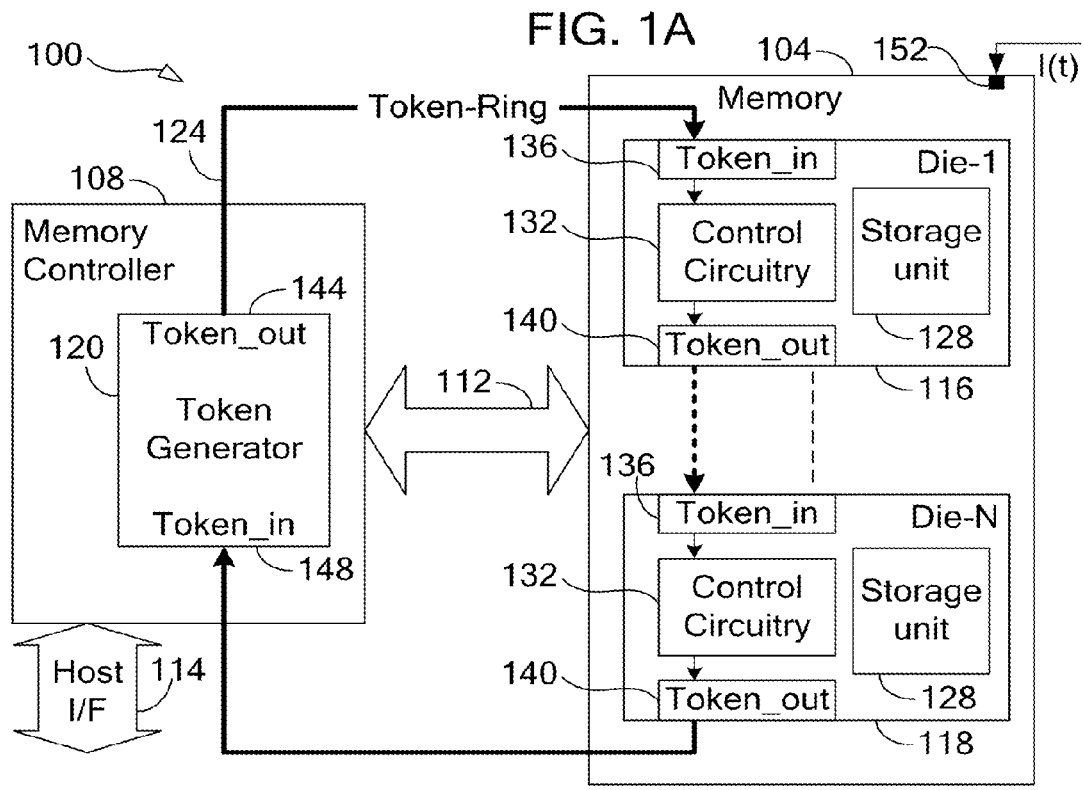
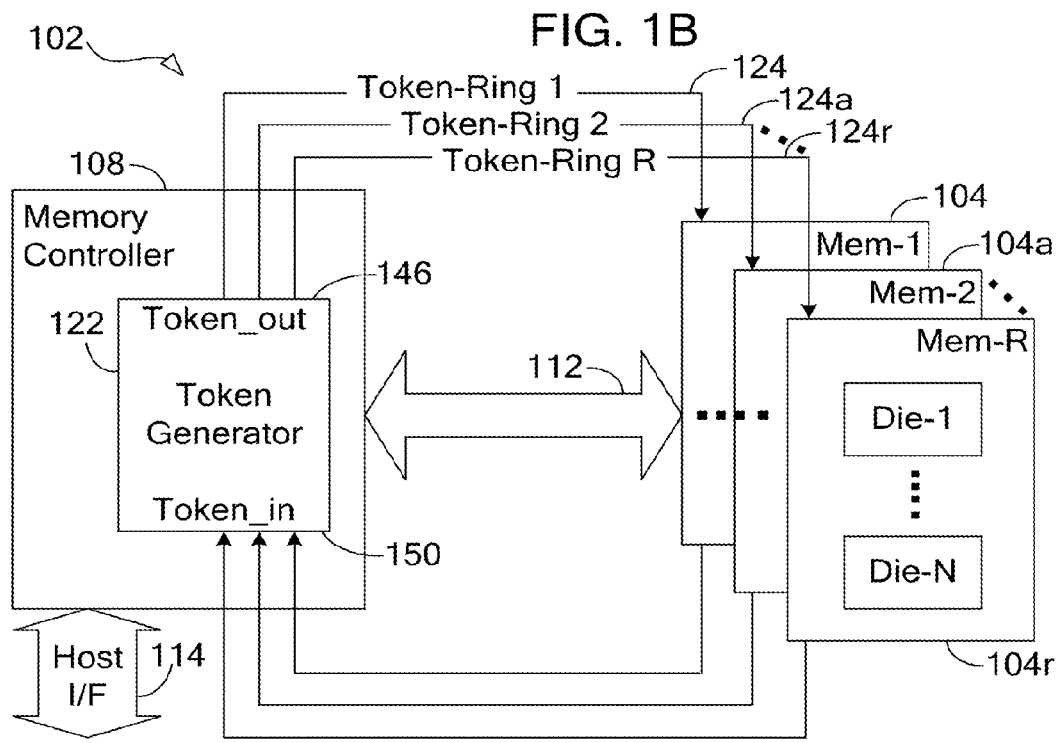

US 9,043,590 B2

REDUCING PEAK CURRENT IN MEMORY SYSTEMS

CROSS-REFERENCE TO RELATED APPLICATIONS

This application is a divisional application of U.S. patent application Ser. No. 13/021,754 filed Feb. 6, 2011 which claims the benefit of U.S. Provisional Patent Application 61/357,114, filed Jun. 22, 2010, whose disclosure is incorporated herein by reference.

FIELD OF THE INVENTION

The present invention relates generally to memory systems, and particularly to methods and apparatus for efficient control of memory system power consumption.

BACKGROUND OF THE INVENTION

Some data storage systems, such as Solid-State Drives (SSD), store data in a group of non-volatile memory devices such as Flash devices. Several techniques for controlling power consumption in such data storage systems have been proposed in the patent literature. For example, U.S. Patent Application Publication 2007/0159907, whose disclosure is incorporated herein by reference, describes a multi-chip package comprising a plurality of memory chips, each of the memory chips comprising an internal circuit, and a power level detector for detecting a level of a power supply voltage to initialize the internal circuit at power-up. The power level detectors in the respective memory chips are configured to initialize corresponding internal circuits at different points of time.

As another example, U.S. Pat. No. 7,200,062, whose disclosure is incorporated herein by reference, describes a dynamic random access memory device that includes a mode register that is programmed with a delay value. In some embodiments, an offset code is also stored in the memory device. The memory device uses the delay value, which may be added to or multiplied by the offset code, to delay the initiation of a received auto-refresh or self-refresh command. A large number of dynamic random access memory devices in a system may be provided with different delay values and possibly offset codes so that the memory device do not all perform refreshes simultaneously in response to an auto-refresh or self-refresh command issued to all of the memory devices simultaneously.

U.S. Patent Application Publication 2004/0160842, whose disclosure is incorporated herein by reference, describes a semiconductor memory device including a plurality of memory chips. The memory chips are divided into first and second groups that are operated in parallel with each other at the time of a data read. Timings of activating sense amplifiers belonging to the first and second groups are made different from each other. Accordingly, the maximum value of peak current generated when the sense amplifiers are activated at the time of a data read is reduced by half in the semiconductor memory device as a whole.

U.S. Pat. No. 4,768,171, whose disclosure is incorporated herein by reference, describes a semiconductor memory circuit, which includes two or more memory cell arrays each having a plurality of memory cells. A peripheral circuit for achieving selective access operation is provided for each array. At least a timing signal and its delayed timing signals are generated in response to a control signal. Both of the timing signal and the delayed timing signal are used to enable the peripheral circuits at different timing.

SUMMARY OF THE INVENTION

An embodiment of the present invention that is described herein provides a memory device including a plurality of memory cells, a token input interface, a token output interface and control circuitry. The control circuitry is configured to accept a storage command, to condition execution of at least a part of the storage command on a presence of a token pulse on the token input interface, to execute the storage command, including the conditioned part, in the memory cells upon reception of the token pulse on the token input interface, and to reproduce the token pulse on the token output interface upon completion of the execution.

In some embodiments, the control circuitry is configured to condition the execution on the presence of the token pulse only when the execution is expected to exceed a current consumption threshold. In an embodiment, the control circuitry is configured to reproduce the token pulse on the token output interface immediately following the reception of the token pulse on the token input interface when there is no storage command to be executed by the memory device that is expected to exceed the current consumption threshold.

In a disclosed embodiment, the execution of the storage command involves carrying out a sequence of operations by the control circuitry, and the control circuitry is configured to delay one or more of the operations in the sequence, which are expected to exceed the current consumption threshold, until detecting the token pulse on the token input interface. In another embodiment, the control circuitry is configured to receive multiple types of token pulses corresponding to multiple respective current consumption thresholds, and to condition the execution on the presence of a given token pulse of a given type only when the execution is expected to exceed the respective current consumption threshold associated with the given type.

In some embodiments, the control circuitry is configured to receive an additional token pulse while executing the conditioned part of the storage command, and to reproduce the additional token pulse on the token output interface. In an embodiment, the execution of the storage command involves carrying out a sequence of operations by the control circuitry, and the control circuitry is configured to condition two or more of the operations in the sequence on the presence of two or more respective token pulses.

There is additionally provided, in accordance with an embodiment of the present invention, a memory controller that includes a controller token output interface, a controller token input interface and token generation circuitry. The a controller token output interface and the controller token input interface are for connecting to multiple memory devices that are connected in a cascade using respective token input and token output interfaces. The token generation circuitry is configured to revolve at least one token pulse in the cascade by providing the token pulse via the controller token output interface to a first memory device in the cascade, accepting the token pulse via the controller token input interface from a last memory device in the cascade, and re-providing the token pulse to the first memory device, so as to cause each memory device in the cascade to condition execution of storage commands on a presence of the token pulse on the respective token input interface of the memory device.

In some embodiments, the token generation circuitry is configured to generate multiple token pulses and to revolve the multiple token pulses in the cascade. In an embodiment, the token generation circuitry is configured to cause each memory device to condition the execution on the presence of the token pulse only when the execution is expected to exceed a current consumption threshold. In a disclosed embodiment, the token generation circuitry is configured to generate multiple types of the token pulses corresponding to multiple respective current consumption thresholds.

In another embodiment, the token generation circuitry is configured to revolve two or more token pulses in the cascade concurrently. In yet another embodiment, the memory devices are connected to the memory controller in two or more separate cascades, and the token generation circuitry is configured to revolve at least one token pulse in each of the cascades.

There is also provided, in accordance with an embodiment of the present invention, a memory system that includes multiple memory devices and a memory controller. Each of the memory devices includes a respective token input interface and a respective token output interface such that the memory devices are connected in a cascade using the token input and token output interfaces. Each of the memory devices is configured to condition execution of storage commands on a presence of a token pulse on the respective token input interface, to execute the storage commands upon reception of the token pulse on the token input interface, and to reproduce the token pulse on the token output interface upon completion of the execution. The memory controller is configured to revolve the token pulse in the cascade by providing the token pulse to a first memory device in the cascade, accepting the token pulse from a last memory device in the cascade, and re-providing the token pulse to the first memory device.

There is further provided, in accordance with an embodiment of the present invention, a method including accepting a storage command in a memory device that includes a plurality of memory cells. Execution of at least a part of the storage command is conditioned on a presence of a token pulse on a token input interface of the memory device. The storage command, including the conditioned part, is executed in the memory cells upon reception of the token pulse on the token input interface. The token pulse is reproduced on a token output interface of the memory device upon completion of the execution.

The present invention will be more fully understood from the following detailed description of the embodiments thereof, taken together with the drawings in which:

BRIEF DESCRIPTION OF THE DRAWINGS

FIGS. 1A and 1B are block diagrams that schematically illustrate memory systems, in accordance with embodiments of the present invention;

DETAILED DESCRIPTION OF EMBODIMENTS

Overview

Figure 2:
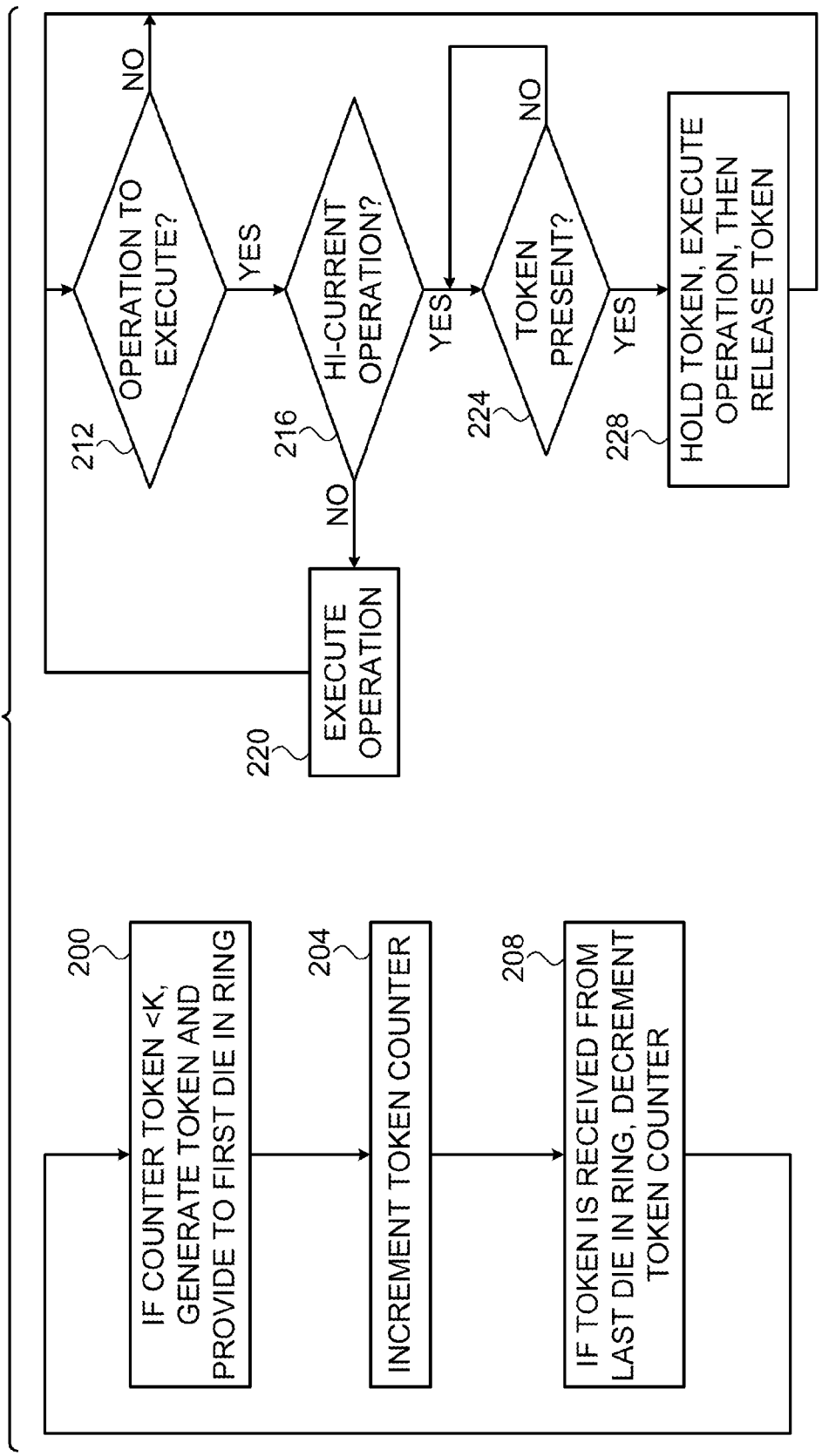
FIG. 2 is a flow chart that schematically illustrates a method for reducing peak current in a Flash memory system, in accordance with an embodiment of the present invention.

Some memory systems (e.g., Solid State Drives—SSDs) comprise a memory controller that stores data in multiple memory devices. In many of these systems there is a specified limit on peak current consumption. Execution of a storage command issued by the memory controller (e.g., read, write or erase) in a memory device involves a sequence of internal operations, some of which draw high current. If such high-current operations occur in different memory devices at the same time, the overall current consumption of the system may exceed the specification.

Embodiments of the present invention provide improved methods and systems for reducing the peak current consumption in memory systems having multiple memory devices. These methods and systems use a token-ring scheme, in which the memory devices pass token pulses to one another. Each token pulse represents a permission to consume a certain current, and the memory devices condition execution of storage commands on the availability of token pulses.

In some embodiments, a memory system comprises a memory controller and multiple memory devices. Each memory device has a token input interface and a token output interface. The memory devices are connected in a cascade using their token input and token output interfaces. The memory controller is connected to the token input interface of the first memory device in the cascade, and to the token output interface of the last memory device in the cascade. The memory controller generates token pulses and revolves them through the cascade by providing the token pulses to the first memory device, accepting the pulses from the last memory device, and then re-providing the pulses to the first memory device in the cascade.

When a certain memory device prepares to execute an internal operation (e.g., part of a storage command) that is expected to consume high current, the memory device checks whether a token pulse is present on its token input interface. If a token pulse is present, the memory device executes the operation, while "holding the token" until the operation is executed. If not, the memory device delays execution of the operation until a token pulse is present. Upon completing the operation, the memory device reproduces the token pulse on its token output interface. If the memory device detects a token pulse on its token input interface, but does not need the token (e.g., because no internal operation is pending or because the pending internal operation is not expected to draw high current), the memory device reproduces the token pulse on its token output interface immediately.

The disclosed token-ring mechanism prevents scenarios in which multiple memory devices carry out high-current operations simultaneously. As a result, the peak power consumption of the memory system is reduced. Moreover, the methods and systems described herein are highly distributed and scalable, since they require only a small number of interface pins in the memory devices and the memory controller. The ring can be extended simply by cascading additional memory devices, and the number of memory devices in the ring in often transparent to the memory controller.

In the disclosed techniques, the decision whether or not to delay execution is made at each memory device, often with a time granularity that is not available to the memory controller. For example, each storage command sent by the memory controller typically triggers a sequence of internal operations in the memory devices. When using the disclosed token-ring mechanism, the memory devices typically condition the execution at the fine granularity of individual internal operations rather than at the coarse granularity of entire storage commands. The memory devices typically use the token-ring mechanism to selectively delay or allow execution of individual internal operations, as opposed to entire storage commands, with fine time resolution that is not available to the memory controller. As such, the disclosed techniques are highly efficient in minimizing any latency that may be added in return for lower peak current.

System Description

FIG. 1A is a block diagram that schematically illustrates a memory system 100, in accordance with an embodiment of the present invention. Memory system 100 may comprise, for example, a Solid State Drive (SSD) or any other suitable type of memory system. System 100 comprises a memory 104, which is connected to a memory controller 108 through a memory interface 112 that serves to transfer data, control and timing signals between controller 108 and memory 104.

The memory controller is typically connected to a host processor (not shown in the figure) through a host interface 114 that serves to transfer data, control and timing signals between the memory controller and the host processor. Memory 104 comprises multiple memory devices. In the present example, memory 104 comprises a Multi-Chip Package (MCP) comprising multiple memory dies denoted Die-1 . . . Die-N. Alternatively, the memory devices may comprise packaged devices that are mounted on a Printed Circuit Board (PCB), or any other suitable type of memory devices.

Each memory device comprises a respective token input interface 136 and a respective token output interface 140. The memory devices are connected in cascade using their token input and token output interfaces. The first and last memory devices in the cascade are denoted 116 and 118, respectively. The token input interface of device 116 and the token output interface of device 118 are connected to memory controller 108, so as to form a token ring 124.

Memory controller 108 sends storage commands to memory 104 for execution in the different memory devices. The storage commands may comprise, for example, read, write and/or erase commands. Executing a given storage command in a given memory device typically involves carrying out a sequence of internal operations in the memory device. For example, a read or write command to a Flash memory device typically involves iterative sequences of internal memory operations. Some of these operations are characterized by high current consumption. For example, bit-line pre-charging operations, which occur at the beginning of program and verification cycles, typically consume high current.

Typically although not necessarily, the current consumption profile during a given storage command comprises several tens of high current peaks whose widths are on the order of several μS, e.g., 10 μS. The time gaps between current peaks may be on the order of several tens of μS, e.g., 30-100 μS. These numerical values are given by way of example, and any other suitable values can also be used.

In some cases, system 100 is not permitted to exceed a certain peak current. If high-current internal operations were to occur simultaneously in multiple memory devices, the maximum peak current specification of system 100 might be exceeded. The token-ring mechanism described below helps to reduce the peak current of system 100. As part of this token ring, memory controller 108 comprises a Token Generator (TG) 120, which provides token pulses to the cascade of memory devices over a token output interface 144, and accepts token pulses from the cascade over a token input interface 148.

Each memory device comprises a storage unit 128, which comprises multiple memory cells. The memory cells may be of any suitable type, such as, for example, Single-Level Cell (SLC) or Multi-Level Cell (MLC) Flash memory cells. Each memory device further comprises Control Circuitry (CC) 132, which is connected to the token input and output interfaces of the device. The memory devices in memory 104 consume supply current denoted I(t) through a power supply port 152.

The token-ring mechanism of system 100 operates as follows: TG 120 generates a token pulse and transfers it through interface 144 and token-ring 124 to interface 136 of device 116. CC 132 of device 116 normally passes the token through by immediately reproducing it on interface 140. Successive memory devices along the ring normally pass the token pulse from one memory device to the next. Finally, memory device 118 transfers the token pulse to interface 148 of TG 120 in the memory controller. The TG passes the token pulse through, thus returning it to memory 104 for another round through ring 124 and so on.

While the token pulse travels through ring 124, CC 132 in each memory device constantly checks the storage commands that are accepted for execution in the memory device from memory controller 108. When an internal operation (which is triggered as part of a storage command) in a given memory device is expected to consume supply current above a predefined current consumption threshold, the CC in the memory device blocks this operation and waits for receiving a token pulse. When the token pulse reaches the given memory device, the CC holds the token, executes the blocked operation, and upon termination of the excess consumption reproduces the token pulse on in the device's token output interface.

The above mechanism ensures that only one high-current memory operation (an operation whose current consumption exceeds the power consumption threshold) is executed at any given moment in system 100. The disclosed token mechanism thus decreases the peak current of system 100, at the possible expense of some delay of high-peak-current operations. In alternative embodiments, TG 120 generates K token pulses that travel through token ring 124, instead of a single token pulse. In these embodiments, only up to K high-current operations can be executed simultaneously. In these embodiments, a memory device that is currently executing a high-current operation (and thus holds a token) may accept another token pulse on its token input interface. In such a case, the memory device typically reproduces the newly-accepted token pulse on its token output interface, and releases the previously-held token upon completing the high-current operation.

In some embodiments, TG 120 uses two or more different types of tokens. Token types may differ from one another, for example, in the memory operations that are permitted to use them, or in the current allocation they permit. In other embodiments, other association criteria between tokens and memory operations can be applied. For example, tokens may be associated with prioritized memory operations. In embodiments wherein the tokens are associated with some memory operation properties or otherwise differ from one another, each token pulse may carry one or more bits for encoding this association or otherwise distinguishing between token pulses of different kinds. CC 132 typically conditions the execution of a memory operation, which corresponds to a certain type of token, on the presence of a token pulse belonging to that type.

The overall token width, as well as its pass-through transition time through the ring, is typically sufficiently short in order to incur low delay penalty. In some embodiments the token and the transition time are considerably narrower than the duration of a typical high-current operation. In an example implementation, the token pulse width is on the order of several clock cycles, e.g., 100 nS. The delay between the token input and token output interfaces in a given memory device (assuming the token pulse is allowed by the memory device to pass through immediately) is on the order of several tens of ns. Generally, however, any other suitable values can be used.

In an embodiment, memory 104 and controller 108 are packaged (e.g., stacked) in the same package. In alternative embodiments, the memory controller and memory devices are packaged separately. TG 120 is typically implemented as part of memory controller 108. However, in some embodiments the TG is realized separately from the memory controller. In the present example, memory 104 comprises a NAND Flash MLC or SLC memory. Alternatively, however, the disclosed techniques can be applied to other memory technologies such as NOR or any other suitable memory technology.

FIG. 1B is a block diagram that schematically illustrates a memory system 102, in accordance with an alternative embodiment of the present invention. Unlike system 100 of FIG. 1A, system 102 uses a multi-ring memory configuration, wherein R memories 104,104a, . . . , 104r form R token rings 124, 124a, . . . , 124r. The R rings are connected to a TG 122. TG 122 generates and transfers token pulses to the R rings through an R-port token output interface 146, and receives the token pulses from the R rings through an R-port token input interface 150. This embodiment thus allows controlling the peak current of R memory devices using the same TG.

The system configurations shown in FIGS. 1A and 1B are example configurations, which are chosen purely for the sake of conceptual clarity. In alternative embodiments, any other suitable memory system configurations can also be used. System elements that are not necessary for understanding of the disclosed techniques have been omitted from the figures for the sake of clarity. For example, several memory packages can be chained in a single ring and, additionally or alternatively, the memory devices in a given memory package can pertain to more than one ring. Typically, memory controller 108 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Method Description

FIG. 2 is a flow chart that schematically illustrates a method for reducing peak current in a Flash memory, in accordance with an embodiment of the present invention. The left hand side of the figure shows the operation of TG 120, whereas the right hand side of the figure shows the operation of a given memory device (a given die in the present example) in the token ring.

In the present embodiment, TG 120 maintains a token counter, which counts the number of token pulses that are currently circulating in the ring. The number of token pulses may vary and take any value up to K, depending on system requirements. Assuming the number of currently-circulating token pulses is less than K, TG 120 generates a new token pulse, at a token generation step 200. The TG provides the new token pulse to the first die in the ring. TG 120 then increments the token counter to account for the new token pulse, at a counter incrementing step 204. If TG 120 receives a token pulse from the last die in the ring, it decrements the token counter, at a counter decrementing step 208. The method loops back to step 200 above. The above-described process is carried out continually by TG 120.

Referring now to the right hand side of FIG. 2: CC 132 of the die in question checks whether an internal memory operation is pending for execution, at an operation checking step 212. If not, the method loops back until a memory operation is pending.

If an internal memory operation is pending, CC 132 checks whether this operation is a high-current operation, at a current checking step 216. If not, the die executes the pending operation, at a normal execution step 220, and the method loops back to step 212 above.

If the pending operation is a high-current operation, CC 132 checks whether a token pulse is present on the token input interface, at a token checking step 224. If a token pulse is not present, the die refrains from executing the high-current operation and waits until a token pulse arrives.

When a token pulse is present, CC 132 executes the high-current operation, at a high-current execution step 228. Typically, CC 132 holds the token pulse while executing the high-current operation, and releases the token pulse (reproduces the token pulse on the token output interface) upon execution completion. The method then loops back to step 212 above in order to execute subsequent memory operations.

Note that the above description does not account for a scenario in which the die receives a token pulse while it is in the process of executing a high-current operation (i.e., while it is already holding a token). In this scenario, CC 132 typically allows the latter token pulse to pass through.

The flow chart shown in FIG. 2 is an example flowchart, which was chosen purely for the sake of conceptual clarity. In alternative embodiments, other suitable flows can also be used for realizing the disclosed methods.

Timing Diagrams

Figure 3A:
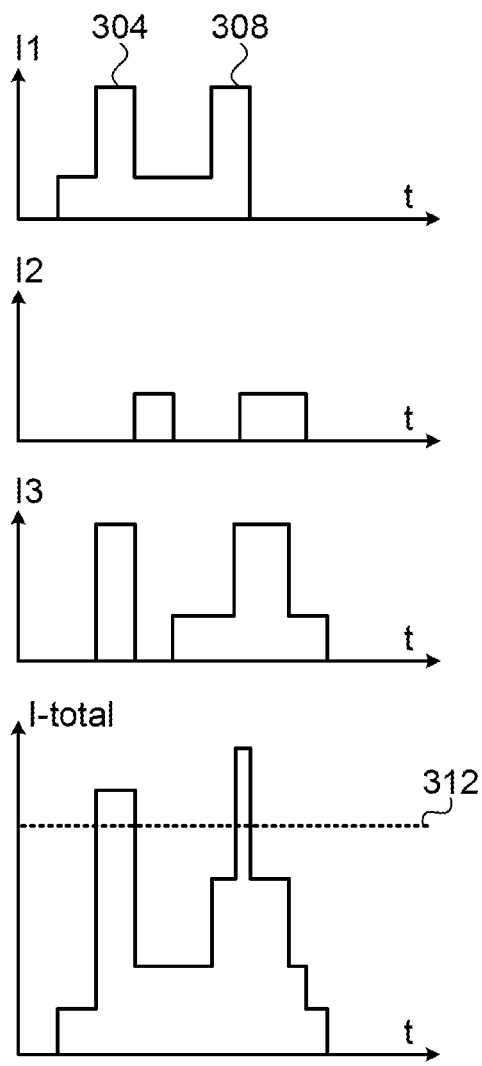
FIGS. 3A and 3B are timing diagrams that illustrate current waveforms, in accordance with an embodiment of the present invention.
Figure 3B:
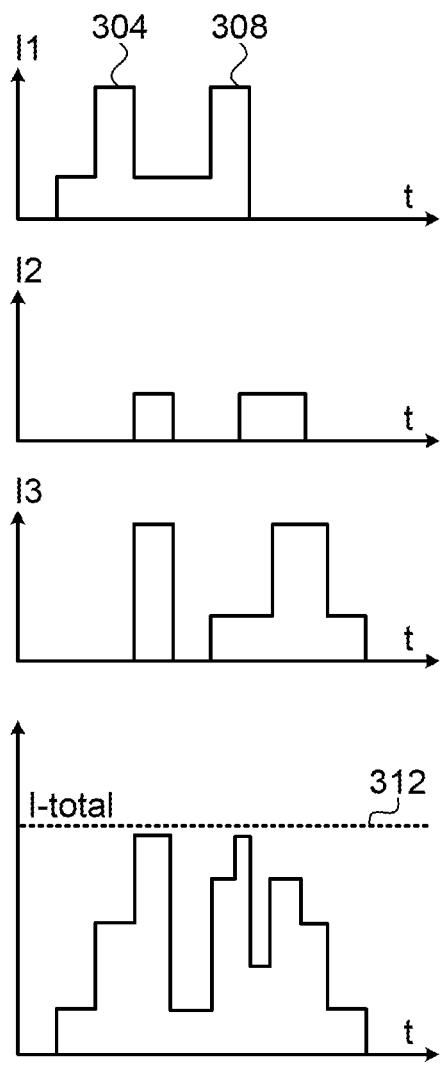

FIGS. 3A and 3B are timing diagrams that illustrate example current consumption waveforms, in accordance with an embodiment of the present invention. The present example refers to a system comprising three Flash dies denoted die-1, die-2 and die-3. FIG. 3A illustrates the current that is consumed without carrying out the disclosed techniques, for reference purposes. FIG. 3B illustrates the current that is consumed while applying the disclosed token ring techniques. As can be seen in the figures, the current waveform of each die comprises a number of power peaks, which are caused by high-peak-current internal operations.

FIG. 3A illustrates example current consumption waveforms of die-1, die-2 and die-3 over time, denoted I1, I2 and I3, respectively. As can be seen in the figure, the current waveforms contain current peaks caused by high-current internal memory operations, such as peaks 304 and 308. The total current consumed by the three dies, i.e., I1+I2+I3, is denoted I-total and is illustrated by the bottom waveform in FIG. 3A. The maximum total current that is permitted for the three dies is marked by a dashed line 312. As can be seen in the figure, the total current occasionally exceeds the maximum permitted current.

FIG. 3B illustrates the I1, I2 and I3 waveforms of die-1, die-2 and die-3, respectively, when using the disclosed token ring technique. I1 and I2 waveforms in FIG. 3B are similar to the corresponding waveforms in FIG. 3A. I3 waveform, which relates to die-3 that follows die-1 and die-2 in the ring, is slightly delayed relative to I3 in FIG. 3A. This delay is a result of die-1 holding a token while executing the operation that causes current peak 304. As a result, a memory operation that was pending in die-3 at the same time (and which caused the total current in FIG. 3A to exceed the maximum permitted value) was delayed. Consequently, the I-total waveform in FIG. 3B, which again comprises the sum of I1, I2 and I3, has lower current peaks relative to the I-total waveform of FIG. 3A. As can be seen in FIG. 3B, the total current consumption when using the disclosed techniques is always below the maximum permitted current.

In the present example, die-2 performed an internal operation that does not draw high current, and therefore did not wait for the token and performed the operation without delay. The other two dies (die-1 and die-3) used the token, which caused the shift of I3 relative to I1. Since die-2 did not use the token, I2 did not move.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A memory controller comprising:
    a controller token output interface coupled to a token input interface of a first memory device of a plurality of memory devices coupled together in series;
    a controller token input interface coupled to a token output interface of a last memory device of the plurality of memory devices; and
    token generation circuitry configured to circulate a token pulse through the plurality of memory devices, wherein the token generation circuitry is further configured to:
        generate and provide the token pulse via the controller token output interface to the first memory device;
        receive the token pulse from the last memory device; and
        in response to receiving the token pulse from the last memory device, provide the token pulse to the first memory device, thereby causing each given memory device to conditionally execute storage commands dependent upon a presence of the token pulse at the token input interface of the given memory device;
        wherein the token generation circuitry is further configured to cause each of the plurality of memory devices to execute storage commands that are expected to exceed a current consumption threshold only upon the condition that the token pulse is present in that memory device.

2. The memory controller according to claim 1, wherein the token generation circuitry is configured to generate multiple token pulses and to circulate the multiple token pulses to the plurality of memory devices.

3. The memory controller according to claim 1, wherein the token generation circuitry is configured to generate multiple types of the token pulses corresponding to multiple respective current consumption thresholds.

4. The memory controller according to claim 1, wherein the token generation circuitry is configured to concurrently circulate two or more token pulses to the plurality of memory devices.

5. The memory controller according to claim 1, wherein the plurality of memory devices are connected to the memory controller in two or more separate series connected loops, and wherein the token generation circuitry is configured to circulate at least one token pulse in each of the series connected loops.

6. A memory system, comprising:
    a plurality of memory devices, each including a respective token input interface and a respective token output interface, wherein the plurality of memory devices is coupled together in a series loop using the token input and token output interfaces, wherein each of the memory devices is configured to conditionally execute storage commands dependent on a presence of a token pulse on the respective token input interface when it is determined that the execution of the storage commands are expected to exceed a current threshold, and wherein each of the memory devices is further configured to execute storage commands that are not expected to exceed the current threshold irrespective of the presence of the token pulse on its respective token input interface, and to reproduce the token pulse on the token output interface; and
    a memory controller coupled to a token input interface of a first memory device of the plurality of memory devices and to a token output interface of a last memory device of the plurality of memory devices, wherein the memory controller is configured to generate and provide the token pulse to the first memory device and to receive the token pulse from the last memory device, and to provide the token pulse to the first memory device in response to receiving the token pulse from the last memory device.

7. The memory system of claim 6, wherein each memory device is further configured to reproduce the token pulse on the token output interface in response to completion of the execution.

8. The memory system of claim 6, wherein each memory device is further configured to reproduce the token pulse on the token output interface in response to receiving the token pulse and determining that the token pulse is not presently needed.

9. The memory system of claim 6, wherein the plurality of memory devices are connected to the memory controller in two or more separate series connected loops, and wherein the memory controller is configured to circulate at least one token pulse in each of the series connected loops.

10. The memory system of claim 6, wherein the memory controller is configured to concurrently circulate two or more token pulses to the plurality of memory devices.

11. A method comprising:
    a memory controller circulating a token pulse through a plurality of memory devices that are coupled together in a series loop using respective token input and token output interfaces, thereby causing each memory device to conditionally execute storage commands dependent upon a presence of the token pulse at a token input interface of the memory device;
    wherein the circulating includes:
        generating at least one token pulse;
        providing the at least one token pulse to the first memory device;
        receiving the at least one token pulse from the last memory device; and
        in response to receiving the at least one token pulse from the last memory device, providing the at least one token pulse to the first memory device;
    wherein the method further comprises:
        receiving a storage command at one of the plurality of memory devices;
        determining if execution of the storage command is expected to exceed a current threshold;
        executing the storage command, irrespective of whether the at least one token pulse is present at the token input interface of the one of the plurality of memory devices if the storage command is not expected to exceed the current threshold; and execute the storage command only upon receiving the at least one token pulse at the token input interface of the one of the plurality of memory devices if the storage command is expected to exceed the current threshold.

12. The method of claim 11, further comprising concurrently circulating two or more token pulses to the plurality of memory devices.

13. The method of claim 11, further comprising circulating a different token pulse through a plurality of series loops that each include a plurality of memory devices that are coupled together in a series loop using respective token input and token output interfaces.

14. The method of claim 11, further comprising generating multiple token pulses and circulating the multiple token pulses to the plurality of memory devices.

\* \* \* \* \*